July 12, 1966   W. B. TYRRELL, JR   3,259,911
DRESS SHIELD AND METHOD OF DRESS SHIELD MANUFACTURE
Filed Jan. 29, 1964
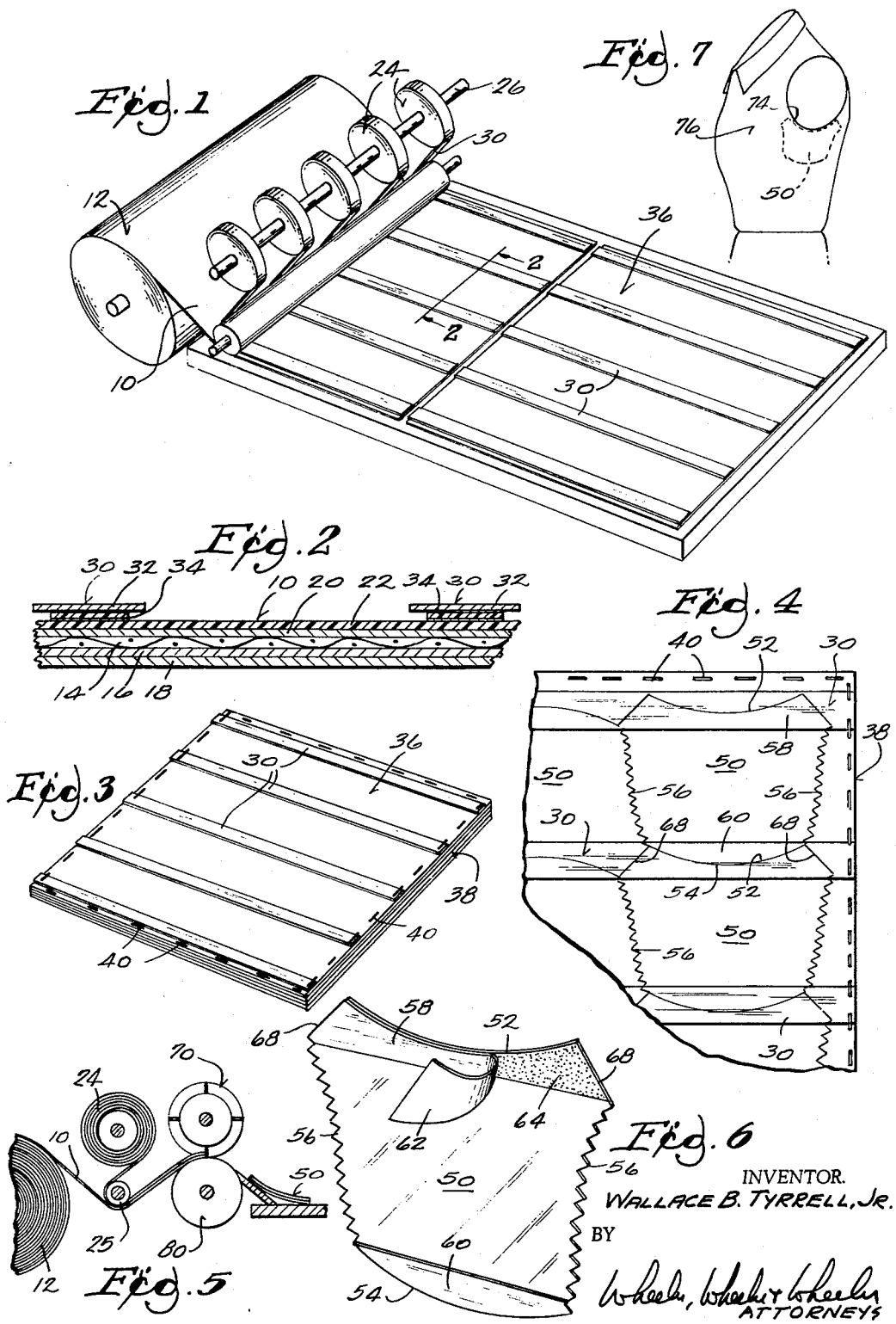
INVENTOR.
WALLACE B. TYRRELL, JR.
BY
Wheeler, Wheeler & Wheeler
ATTORNEYS

United States Patent Office 3,259,911
Patented July 12, 1966

3,259,911
DRESS SHIELD AND METHOD OF DRESS SHIELD MANUFACTURE
Wallace B. Tyrrell, Jr., Venice, Fla., assignor to Tyrrell Industries, Inc., Venice, Fla., a corporation of Florida
Filed Jan. 29, 1964, Ser. No. 340,957
8 Claims. (Cl. 2—56)

This invention relates to a disposable dress shield and method of, and intermediate product for, dress shield manufacture.

A multi-ply web comprising plies of absorbent paper and waterproof material such as polyethylene, between which is a ply of coarse mesh gauze, is withdrawn from a supply roll and receives a plurality of "transfer tapes," the tapes being spaced transversely of the web and each tape comprising a strip coated with release material and a strip of plastic coated on both faces with pressure-sensitive adhesive.

From the resulting web, having strips of transfer tape extending longitudinally thereof, dress shields are die cut in an orientation such that rows of dress shields extend transversely of the original web, the dress shields in consecutive rows being mutually inverted and interlocked one with another so that there is virtually no waste. Each dress shield has a part of one of the transfer tapes across its top and another across its bottom margins. The shields are preferred to as interlocked because each dress shield has a concave top margin complementary to a convex bottom margin on a like shield and oblique shoulders at each end of the concave top margin. Moreover, each of the side margins of the resulting dress shields has a sinuous curve matching the sinuous lateral side margin of a dress shield in inverted orientation in the next consecutive row.

According to one embodiment of the method invention, the dress shields are blanked from the web in a continuous operation, using a rotary die. In another embodiment of the method invention, the web is first cut into sheets and the sheets are stacked and their side margins are stapled or otherwise connected to make lateral displacement impossible, the die used to blank the finished shields thereupon being passed through successive sheets in the stack so that, in each operation of the die, shields are cut from corresponding portions of all of the successive sheets in the stack.

The resulting shield comprises a water resistant and preferably waterproof ply which is intended to lie adjacent the garment in which the shield is used, and a softer and absorbent ply exposed on its other face. Along both of the top and the bottom margins of the shield there are transverse strips of transfer tape conforming marginally to the concave and convex margins of the shield and including release-coated protective strips which can be removed to expose pressure-sensitive adhesive for attaching the waterproof face of the shield to the garment. In the preferred embodiment herein disclosed, the shield includes plural layers of creped tissue wadding with an intervening ply of very coarse mesh gauze which gives the shield strength and also increases the absorptive capacity of the wadding.

In the drawings:

FIG. 1 is a view in perspective showing the application of transfer tapes to the prepared multi-ply web.

FIG. 2 is an enlarged fragmentary detail view taken in section transversely of the web on the line 2—2 of FIG. 1.

FIG. 3 is a view in perspective of a stack of sheets cut from a web on which tapes have been applied as in FIG. 1.

FIG. 4 is an enlarged detail view showing the manner in which finished shields are blanked from the superimposed sheets of the stack shown in FIG. 3.

FIG. 5 is a fragmentary detail view in longitudinal section through a machine for practicing an alternative method of blanking shields individually from the moving web without first cutting the web into sheets and stacking the sheets.

FIG. 6 is a detail view on an enlarged scale showing a finished shield embodying the invention as it appears with one of the release strips partially lifted preparatory to the use of the shield in a garment.

FIG. 7 is a fragmentary detail view in perspective showing a portion of a garment with the finished shield illustrated in dotted lines as applied therein.

The web 10 wound on supply roll 12 preferably comprises a number of laminations as shown in FIG. 2. There is a central core 14 of wide mesh fabric in which the warp and weft threads may both be nylon, or at least one set of threads may be rayon or cotton. Other materials may also be used, this being unimportant to the present invention.

To the central core 14 are laminated plies 16 and 18 of tissue which are at the bottom of the composite web as it comes from the supply roll and another ply 20 of tissue and a top ply 22 of polyethylene.

As the laminated web 10 is drawn from the roll 12, it receives parallel, laterally spaced transfer tapes applied when the web is pulled past a row of supply rolls 24 of transfer tapes 30. The tape supply rolls 24 may be mounted on a spindle 26 on which they are spaced axially as shown in FIG. 1, the spacing representing the mesne distance between top and bottom margins of the shields to be cut in transverse rows from web 10. Each of the tapes 24 comprises a silicon coated or otherwise prepared protective strip 32 and a strip 34 of cellophane or the like coated on both faces with pressure-sensitive adhesive. Both the strip 34 adhesive coated on both faces and the protective strip 32 are well known in the art individually and in assembly for use in other connections; known to the art as a transfer tape.

The laminated web 10 with laterally spaced transfer tapes attached constitutes an intermediate product saleable as such. It may be re-rolled for the later production of shields although, in the preferred practice of the invention, the shields are immediately cut therefrom either in one continuous operation or by dividing the web into sheets, stacking the sheets, and die cutting the shields from the sheets.

In the practice of the method shown in FIGS. 1, 3 and 4, sheets such as that indicated at 36 are severed from the web 10. The sheets 36 are then assembled in a stack as shown at 38 in FIG. 3 and they are marginally connected against relative lateral displacement, as by means of staples 40. The several shields 50, one of which is separately illustrated in FIG. 6, are then die cut from the sheets 36 of the stack 38 in rows extending transversely of the direction of the original web 10, with the shields of alternate rows oriented to be relatively inverted in the manner which clearly shows in FIG. 4. Each shield has a concave top margin 52 which nests with a complementary convex bottom margin 54 of the next shield in the same row. The side margin 56 of each shield has a sinuous curve complementary to the curve of the side margin of the laterally adjacent and the relatively reversely oriented shield of the next row. Preferably, although not necessarily, the side margins 56 are serrated.

The several shields are so placed on the multi-ply web or sheet from which they are cut that the concave top margin 52 is in part cut from a portion 58 of one of the transfer tapes 30, while the complementary convex margin 54 carries another part 60 of the same tape. Since the die which cuts the shield also cuts through each of the transfer tapes 30, the top and bottom margins of the respective shields have marginally registering portions of the respective transfer tapes. When the die cut portion of release strip 62 is pulled off as shown in FIG. 6, it exposes the pressure-sensitive adhesive 64 on the remaining transfer tape portion 58. Similarly, when the release strip portion 60 is pulled from the lower end of the resulting shield 50, it will expose pressure-sensitive adhesive.

Thus, each dress shield 50 has a strip of transfer tape across its upper end and another strip across its lower end and each such strip of transfer tape includes a removable piece of release coated protective ply which normally covers the adhesive but is readily pulled free to expose the adhesive by means of which the shield may be mounted beneath the arm pit 74 of a garment such as that diagrammatically illustrated at 76 in FIG. 7. The method of manufacture assures that the pressure-sensitive adhesive exposed by the removal of the protective ply of the tape will follow exactly the margin of the shield so that every portion of such margin will adhere to the garment and there will be no tendency for the margin of the shield to roll up as it might do if some portion thereof were not fully adhered.

The concave upper margin 52 is very desirable as a means of fitting the shield beneath the arm of the wearer but in addition it is found very desirable also that the shield have a convex lower margin at 54 and beveled shoulder margins at 68 at each end of the arcuate margin 52 and sinuous side margins 56, as best shown in FIG. 4.

In lieu of cutting sheets 36 and stacking these as at 38 in FIGS. 3 and 4, the web 10 to which the transfer strips 30 have been applied can be passed through a rotary die 70 and complementary roll 80 so that the successive shields are blanked from the web in the same continuous operation in which the transfer strips are laminated to the web.

The transfer strips 30 must be so wound on the supply rolls 24 and/or guided about idler rolls 25 that as the strip is unwound the pressure-sensitive coating on the underside of the cellophane strip 34 is exposed to the polyethylene ply 22 of the composite web 10. Then, when the protective strip 32 is pulled off, the adhesive coating 64 is exposed to cause the polyethylene side of the composite shield to adhere to the garment, the softer face of the paper ply 18 being exposed to the skin of the wearer.

When a dress shield embodying the present invention has been used, it can readily be pulled from the underarm portion of the garment to which it has been applied and will leave no perceptible adhesive adhering to the fabric. While some adhesives are better than others in this regard, I have found that every one of the commercially available plastic tapes coated on both faces has been usable for my purposes insofar as I have tested these.

I claim:

1. A dress shield for underarm use in a garment, said shield comprising respectively absorbent and water repellent plies and having opposite ends, the upper end having a concave upper margin and the lower end having a downwardly convex lower margin, and pressure sensitive adhesive transfer tapes extending tranversely of the shield at its said ends and having respective margins in registry with the corresponding margins of the upper and lower ends of the shield, each of said tapes having substantially rectilinear margins opposite the margins which register with the upper and lower ends of the shield, said rectilinear margins extending continuously across the shield.

2. A dress shield according to claim 1 in which said absorbent plies comprise a plurality of plies of creped tissue wadding and the water repellent ply is a plastic ply, the said transfer tapes at the top and bottom of the shield being adherent to the plastic ply and each such tape having a removable protective strip and a pressure-sensitive adhesive exposed upon removal of said strip.

3. A dress shield for underarm use in a garment, said shield comprising respectively absorbent and water repellent plies and having opposite ends, the upper end having a concave upper margin, and transfer tapes extending transversely of the shield at its said ends and having respective margins in registry with the corresponding margins of the upper and lower ends of the shield, said absorbent plies comprising a plurality of plies of creped tissue wadding and the water repellent ply being a plastic ply, the said transfer tapes at the top and bottom of the shield being adherent to the plastic ply and each such tape having a removable protective strip and a pressure-sensitive adhesive exposed upon removal of said strip, a coarse mesh gauze ply intervening between other plies of said shield.

4. As a new article of manufacture, a web from which dress shields and the like can be cut, such web comprising superimposed plies of absorbent material and water resistant material, the latter being provided substantially throughout its length with laterally spaced substantially parallel strips of pressure sensitive adhesive transfer tape, so that upon cutting dress shields therefrom said transfer tape is divided between adjacent shields.

5. As a new article of manufacture, a web from which dress shields and the like can be cut, such web comprising superimposed plies of absorbent material and water resistant material, the latter being provided substantially throughout its length with laterally spaced substantially parallel strips of transfer tape, the web comprising a plurality of plies of creped tissue between certain of which is interposed a ply of large mesh gauze, each transfer tape including a plastic strip coated on both sides with pressure-sensitive adhesive, the adhesive at one side of the tape being adherent to the water resistant ply of the web and the adhesive on the other side of the strip having releasably connected with it a lightly adherent protective strip which can readily be pulled free to expose the last mentioned adhesive.

6. A method of manufacturing dress shields which includes the steps of adhering laterally spaced strips of transfer tape to a waterproof ply at one side of a composite web which includes such a ply and at least one ply of water absorbent material, and thereafter cutting shields from said web in positions such that each of said shields includes a portion of one of said tapes at each of two opposite margins of the shield.

7. A method of manufacturing dress shields which includes the steps of adhering laterally spaced strips of transfer tape to a waterproof ply at one side of a composite web which includes such a ply and at least one ply of water absorbent material, and thereafter cutting shields from said web in positions such that each of said shields includes a portion of one of said tapes at each of two opposite margins of the shield, such shields being cut in rows which extend transversely of the web, the cutting of one shield from the next adjacent shield in said row including the cutting of one of said tapes longitudinally of the web whereby a portion of one tape appears at one end of one shield and at the opposite end of the next corresponding shield in the same row.

8. A method of manufacturing dress shields which includes the steps of adhering laterally spaced strips of transfer tape to a waterproof ply at one side of a composite web which includes such a ply and at least one ply of water absorbent material, and thereafter cutting shields from said web in positions such that each of said shields includes a portion of one of said tapes at each of two opposite margins of the shield, such shields being cut in rows which extend transversely of the web, the cutting of one shield from the next adjacent shield in said row including the cutting of one of said tapes longitudinally of the web whereby a portion of one tape appears at one end of one shield and at the opposite end of the next corresponding shield in the same row, each shield being cut to provide a concave margin at one end and a convex margin at the other, the convex margin of one shield being cut from and being complementary to the concave margin of another shield in the same row and the line of cut between consecutive shields of said row producing a corresponding concave margin in a transfer tape portion adhering to one end of one shield and a convex margin in the transfer tape portion adhering to the opposite end of the next consecutive shield.

References Cited by the Examiner

UNITED STATES PATENTS

| | | | |
|---|---|---|---|
| 2,140,211 | 12/1938 | Shaw | 12—146 X |
| 2,231,552 | 2/1941 | Sewall | 12—146 X |
| 2,438,771 | 3/1948 | Topjian | 2—53 |
| 2,562,508 | 7/1951 | Rand | 2—53 |
| 2,580,388 | 1/1952 | Allen | 2—49 |
| 2,633,440 | 3/1953 | Scholl. | |
| 2,747,193 | 5/1956 | Pulsifier | 2—56 |
| 2,830,297 | 4/1958 | Sabee | 2—49 |
| 3,001,201 | 9/1961 | Hauser | 2—56 |

FRANK J. COHEN, *Primary Examiner.*

JORDAN FRANKLIN, *Examiner.*

A. R. GUEST, *Assistant Examiner.*